Dec. 15, 1964          F. F. HOLUB          3,161,541
SYNTHETIC RESIN AND CONDUCTORS INSULATED THEREWITH
Filed April 27, 1959
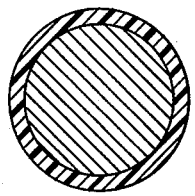
Inventor:
Fred F. Holub,
by Joseph T. Cohen
His Attorney.

United States Patent Office 3,161,541
Patented Dec. 15, 1964

3,161,541
SYNTHETIC RESIN AND CONDUCTORS
INSULATED THEREWITH
Fred F. Holub, Scotia, N.Y., assignor to General Electric
Company, a corporation of New York
Filed Apr. 27, 1959, Ser. No. 809,227
5 Claims. (Cl. 117—232)

This invention relates to thermally curable synthetic polyester-amide resins. More particularly, this invention relates to synthetic polyester-amide resins comprising the product of reaction of (1) from 25 to 56 equivalent percent of a lower dialkyl ester of a member selected from the class consisting of terephthalic acid and isophthalic acid and mixtures of said members, (2) from 15 to 46 equivalent percent ethanolamine(2-aminoethanol), (3) from 0 to 30 equivalent percent ethylene glycol, and (4) from 12 to 44 equivalent percents glycerine (glycerol), the total equivalent percent of (2) and (3) being at most 46 equivalent percent. The invention also includes methods to prepare these compositions and conductors insulated with those compositions.

The single figure in the attached drawing shows an embodiment of my invention directed to an insulated conductor composed of a metallic core 1 (e.g., copper, aluminum, alloys of copper and aluminum, etc.) containing an insulation 2 therefor comprising my cured polyester-amide resins.

In the past, attempts have been made to prepare synthetic resins suitable for use as electrical insulating material, particularly material which is satisfactory for use as slot insulation in dynamoelectric machines and for use as insulation for conductors which are to be employed as magnet wires (insulated electrical conductors) in electrical apparatus. It is well known that insulating material which is to be employed for these purposes must be able to withstand extremes of mechanical, chemical, electrical and thermal stresses. Thus, wires to be employed as coil windings in electrical apparatus are generally assembled on automatic or semi-automatic coil winding machines which, by their very nature, bend, twist, stretch and compress the enamelled wire in their operation. In order to conserve space in electrical apparatus, it is essential that the individual turns which make up the coils be maintained in close proximity to each other. Because of the closeness of the turns and the fact that there may be a large potential gradient between adjacent turns, it is necessary that the resins employed as wire enamels have a high dielectric strength to prevent short circuiting between adjacent coils. In operation of electrical apparatus containing coiled wires, high temperatures are often encountered and the enamels must be able to withstand these high temperatures as well as the mechanical stresses and vibrations encountered in electrical apparatus so that the enamel coating does not soften or come off the wire.

It is well known that the power output of motors and generators can be increased a great deal by increasing the current density in the magnet wires of these machines. However, it has not been practical in the past to increase the current density through magnet wires to the extent desired because of the attendant rise in the operating temperature of the magnet wires caused by the increased current. This increased temperature has meant that conventional organic enamels, which have been relatively economical, could not be used in high current density windings because the higher operating temperatures encountered caused decomposition of the enamel. One method of allowing increased current densities in magnet windings has been to use so-called "Class B" insulation on the magnet wires. This Class B insulation is mostly inorganic in nature and comprises an inorganic fibrous material such as asbestos or glass fibers with an inorganic binder or an organic binder holding the inorganic fibers together. Class B insulated magnet wire has been found to be deficient in magnet wire applications since its resistance to abrasion is so low that it has been impossible to fabricate coils of Class B magnet wire on automatic wire winding machines without tearing and shredding the insulation with the subsequent short circuiting of the coils in use. Another drawback to Class B insulated magnet wires is that the insulation tends to be bulky so that it is impossible to place the wires as close together as organic film insulated wires. Since Class B insulated wires require hand manipulation, it has been found that the cost per unit power output in a Class B insulated motor is higher than the corresponding cost per unit power output in a motor using conventional organic coated wires even though the Class B insulated product may have a higher power output per unit of conductor cross section.

In the past, many attempts have been made to prepare magnet wires which meet all of the requirements of high temperature magnet wire while still being economically feasible. Cost per unit power output of a resulting dynamoelectric machine is a very important factor in any magnet wire insulation since an excessive magnet wire cost tends to make a magnet wire impractical for use regardless of its properties. Excessive cost of a magnet wire is generally the result of one of the following five factors. The first, and the most obvious factor is the cost of the raw materials in the resin which is to be applied to the conductor. The second cost factor is related to the ability of the resinous material to be dissolved in readily available, inexpensive solvents. Since resinous materials are preferably stored and transported in solution, the bulk and weight of the solvent play a large part in the cost of having the resin at the place where it is to be used at the time it is to be used. In practice, it has been found that it is desirable to employ resinous materials as wire enamels which are capable of being held in solutions which contain at least 30 to 50 percent, by weight, of solids. Since the solvents in the resinous solution are generally allowed to escape without recovery from the wire coating apparatus, the cost of the solvent is an important factor in the cost of the cured enamel. The third factor which vitally affects the cost of an enamelled wire is the time required to cure the enamel once it has been applied to the conductor. If this time is excessive, an unduly large baking oven is required or the speed of the wire through the oven must be maintained at an uneconomically low rate. The fourth factor which vitally affects the cost of a magnet wire is the flexibility of the conditions which may be employed in applying the resin to the conductor and in curing the resin once it has been applied. If the wire speed range in the curing operation, the curing temperature, and the wire diameter sizes are critical, it is obvious that a large amount of defective magnet wire may be prepared under mass production conditions, whereas, if large variations in curing conditions are allowable, only a very small amount of the magnet wire prepared need be discarded because of defective insulation. The fifth factor which is important in the cost of a magnet wire is the ability of the same resinous solution to be applied to both round and rectangular conductors and to conductors made of various metals. If different resin solutions must be used for each type of conductor, the time required to change the resin solution is an integral part of the magnet wire cost.

In order to determine whether the insulation on a magnet wire will withstand the mechanical, electrical and thermal stresses encountered in winding machines and electrical apparatus, it is customary to apply the resin to a conductor usually from solution, and often from aqueous dispersion or from solid melcl, and to subject the enamelled wire to a series of tests which have been designed to measure the various properties of the enamel on the wire. These tests, which will be described in detail later, include the abrasion resistance test, the heat shock test, and the flexibility test.

It has been found that the enamel on a conductor which will withstand the mechanical, chemical and electrical stresses encountered in magnet wire applications and which is operable at temperatures of at least 135° C. for extended periods of time must show no insulation defects in windings having a diameter more than five times the diameter of the conductor when wound on a conical mandrel having an apex angle of about 20 degrees in the heat shock test.

An object of this invention is to provide a synthetic heat-curable polyester-amide resin which is thermally stable at temperatures of at least 135° C. for extended periods of time.

A further object of this invention is to provide a heat-curable synthetic polyester-amide resin which has improved mechanical and thermal properties and which is adaptable for use as a coating for electrical conductors which are to be employed as magnet wires.

A still further object of this invention is to provide an improved heat curable polyester-amide resin which is adaptable for use as slot insulation in dynamoelectric machines at temperatures of at least 135° C.

I have discovered an economical polyester resin having improved mechanical and thermal properties which is adaptable for use as magnet wire insulation and slot insulation in electrical apparatus. This resin comprises the product of reaction of (1) from 25 to 56 equivalent percent, preferably from 36 to 50 equivalent percent, of a lower dialkyl ester of a member selected from the class consisting of terephthalic acid and isophthalic acid and mixtures of said members, (2) from about 15 to 46 equivalent percent, and preferably from 25 to 40 equivalent percent, of ethanolamine, (3) from 0 to 30 equivalent percent ethylene glycol, and (4) from about 12 to 44 equivalent percent, and preferably from 12 to 32 equivalent percent glycerine, the total equivalent percents of (2) and (3) being at most 46 equivalent percent, and preferably at most 40 equivalent percent.

Among the lower dialkyl esters of terephthalic or isophthalic acids which may be used in the polyesters of the present invention are included, for example, those esters containing alkyl radicals having from 1 to 8 and preferably from 1 to 4 carbon atoms. These lower dialkyl esters include, for example, the dimethyl ester, the diethyl ester, the dipropyl ester, the dibutyl ester, etc.

The term "functional group" as used in the present application is intended to refer to a carboxyl group (—COOH), an ester group (—COOR, where R is a lower alkyl of from 1 to 4 carbon atoms), or a hydroxyl group (—OH), or the amino group $$(-\overset{H}{N}H)$$

in the ethanolamine. The term "equivalent" as used in the present application refers to the number of mols of a substance multiplied by the number of functional groups present in its structure. Thus, the number of equivalents of dimethyl terephthalate in a quantity of dimethyl terephthalate is the number of mols of dimethyl terephthalate present times two. The number of equivalents of glycerine present in a given quantity of glycerine is the number of mols of glycerine present in that quantity times three.

The number of equivalents of ethanolamine in a quantity of ethanolamine is calculated, for purposes of equivalent percent, as the number of mols of ethanolamine present, times two. This is due to the fact that in the esterification reaction which the ingredients undergo in the preparation of my polyester-amide compositions, only one hydrogen on the amino group in the ethanolamine enters into the esterification reaction to form an amide group; once having formed the amide group, the remaining hydrogen on the nitrogen is relatively inactive under the conditions of esterification. However, under more extreme conditions of temperature, this amido hydrogen will react as an additional site, which distinguishes my polyester-amide compositions from the usual polyester compositions derived from ethylene glycol alone. This additional amido hydrogen introduces further functionality whereby my polyester-amide compositions can be reacted with agents, such as organic polyisocyanates, to give thermoset products. The term "equivalent percent" as used in the present application refers to the number of equivalents of a particular reactant divided by the total number of equivalents of all reactants times one hundred. The compositions employed in the present invention are described in terms of equivalents instead of in terms of moles, since the ingredients which make up the polyester-amide resins react equivalent for equivalent rather than mol for mol.

Polyester-amide resins prepared from a mixture of ingredients having a composition range within the scope of this invention are highly satisfactory for use as magnet wire insulation and slot insulation at temperatures of at least 135° C. for continuous operation. The suitability of these enamelled wires for the high temperature magnet wire application is indicated by the fact that these wires pass all of the tests described above. In addition, these polyester-amide resins utilize relatively inexpensive raw materials, are soluble in inexpensive solvents, are curable at a rapid rate in a wire curing tower, and may be applied to various sizes, shapes, and compositions of conductors at a wide range of speeds and temperatures.

The flexibility test mentioned above is a test employed to determine the mechanical properties of a magnet wire. The flexibility of the enamel on a magnet wire is determined by bending the enamelled conductor around mandrels having diameters of from 1 to 10 times the diameter of the metallic conductor, and examining the wire for any imperfections on the surface of the enamel. The imperfections which may be noted on the surface of the enamel are a series of parallel surface lines or fissures which are perpendicular to the long axis of the wire. This condition of the enamel film is known as crazing. Another defect which can sometimes be observed is a break in the enamel film in which the two sections of the film are actually physically separated and the opening extends in depth to the exposed conductor. This defect is called a crack. A third defect which may be noted is a mar or blemish in the enamel film.

In order to determine whether a magnet wire may be employed at high temperatures, it is necessary to measure properties of the enamelled conductor at high temperatures. Among the properties which must be measured are the heat shock characteristics of the enamel. Since it is well known that copper is one of the most economical conductors available, all of the thermal tests of magnet wire are conducted on copper magnet wire. When measuring properties of an insulating film such as heat shock, etc., what is actually being measured is the effect of thermal degradation of the enamel on the particular properties being measured. The most straightforward method of measuring this thermal degradation of an enamel on a wire is to maintain the enamelled wire at the temperature at which it is desired to operate the wire until decomposition takes place. However, this method is impractical in the evaluation of new materials because of the relatively long periods of time involved. Ordinarily it is customary to conduct accelerated heat life tests on these on these enamelled wires. Since thermodynamic theories show that the rate of a given reaction can be determined as a function of temperature, it is possible to select elevated temperatures for thermal tests of enamel films and to calculate the thermal properties of the enamelled wire at the desired operating temperature from these accelerated test data. Although it might be expected that degradation reactions which occur at elevated test temperatures might not occur at temperatures at which the magnet wire is to be operated because of activation energies required to initiate certain reactions, experience has shown that accelerated heat life tests are an accurate method for determining the heat life of a material at operating temperatures.

In determining whether an enamel film will lose its flexibility after extended periods of time at operating temperature, a sample of the insulated magnet wire enamel having a conductor diameter X, was wound on a mandrel having a diameter 3X or 5X, removing the sample of wire from the mandrel and placing it in a circulating air oven maintained at around 300° C. for varying lengths of time after which the sample of wire should show no surface defects or cracks in order for the enamelled wire to have sufficient flexibility for steady operation at a temperature of at least 135° C. This test is identified hereafter as the "heat shock test."

Unexpectedly, I have found that polyester-amide resins within the scope of the present invention are able to pass all of the tests described above when employed as magnet wire insulation. Therefore, these resins are satisfactory for use as insulation on electrical conductors which are to be used at temperatures of at least 135° C. When alkanolamines other than ethanolamine, for instance, triethanolamine, are employed, the resulting product is deficient in at least one of the several properties required for a high temperature insulating material.

Resins may be prepared using any material or mixture of materials from each of the three groups of components of the polyester-amide resins of the present invention, and any of the resulting resins are able to meet the physical, chemical, electrical and thermal properties which are required in magnet wire insulation operable at a temperature of at least 135° C. for indefinite periods of time. In the case of the acid component of the resin, the use of a lower dialkyl ester of terephthalic acid produces enamels which can be applied to conductors at faster speeds and which have greater solvent resistance than resins prepared using a lower dialkyl ester of isophthalic acid. When enamels are prepared from isophthalic acid or its derivatives, there is less sublimation of the ingredients of the resin during the cooking and the resulting reaction product is more soluble in commercial solvents than is the case with enamels prepared from esters of terephthalic acids.

The synthetic polyester-amide resins of the present invention may be formed in fairly conventional ways. Thus, the lower dialkyl ester of terephthalic acid and isophthalic acid, the ethanolamine, or mixture of the latter and ethylene glycol, and the glycerol are merely added to any suitable reaction vessel. This reaction vessel may be formed of any suitable material such as glass, stainless steel or any of the other metals commonly employed in processing polyester-amide resins. Since the reaction involved in forming the polyester-amide resins of the present invention is essentially an alcoholysis reaction, the net effect of the reaction is to substitute glycerine, or ethanolamine or ethanolamine and ethylene glycol for the lower alkyl radicals of the lower dialkyl isophthalates or terephthalates with the concurrent liberation of the lower alcohol. In the case of the dimethyl esters of the acids the alcohol which is liberated is methanol. Therefore, suitable means should be provided for eliminating the methanol or other lower alcohols liberated during the reaction period. In general, heat is applied to the reaction mixture and the lower alcohol liberated is either vented to the atmosphere or collected in a condenser system. Since the lower dialkyl esters of terephthalic acid have a tendency to sublime when heated too rapidly, it is desirable to provide means for condensing this sublimate while still allowing the lower alcohols to escape from the system. This may be accomplished by operating a condenser over the reaction vessel at a temperature suitable to condense the sublimate while allowing the lower alcohol vapors to escape.

Since alcoholysis reactions are rather slow when run without catalysts, I prefer to use alcoholysis catalysts when preparing the polyester resins of the present invention. Among the many alcoholysis catalysts which may be used are included, for example, lead oxide, lead acetate, zinc oxide, cadmium acetate, cuprous acetate, zinc acetate, magnesium acetate, beryllium acetate, stannic acetate, ferric acetate, nickel acetate, etc. The amount of catalyst employed is not critical and may vary over a wide range depending on the particular polyester-amide system under consideration. In general, I may employ from about 0.01 to about 5 percent, by weight, of the alcoholysis catalyst, based on the total weight of the dibasic compounds. Higher concentrations of such catalyst may be employed but no advantage is gained by such use.

In preparing the polyester-amide resins of the present invention I have found it desirable to heat the reactants to obtain as high a molecular weight material as possible without causing gelation of the resulting product. The reaction is accomplished by heating the reactants from room temperature to a temperature of about 200° to 250° C. over a period of from two to six hours. During the initial heating period it is sometimes found that sublimation of the lower dialkyl esters of the acids employed begins to occur. To prevent this sublimation, xylene or some similar material may be added to the reaction mixture to keep the lower dialkyl ester of the acid in solution. The xylene or other similar material takes no part in the reaction and is distilled from the reaction mixture during the course of the reaction. Any water which is present in the raw materials employed in the reaction is also distilled from the reaction mixture during the heating process. One source of moisture commonly found in the reaction mixture is the water which is dissolved in the glycerine. Thus, U.S.P. glycerine contains about 5 percent, by weight, of dissolved water which azeotropically distills from the reaction mixture with xylene.

The alcoholysis catalyst may be added to the reaction mixture at the beginning of the heating period or after the reactants have been heated for a short length of time to remove any water present in the raw materials employed. After heating the reactants to the desired final temperature between about 200° and 250° C., the reaction may be stopped or the product may be maintained at the final temperature for another 0.5 to 4 hours to increase the molecular weight. When the product is maintained at this final temperature it is necessary to stop the reaction before the resin reaches such a high molecular weight that gelation occurs.

The reaction is generally terminated by pouring a suitable solvent into the hot polyester-amide resin to form a solution having a solids content of about 30 to 50 percent, by weight. This solution is then filtered to remove any insoluble matter. Among the many solvents suitable for the polyester resins employed in the present invention may be mentioned m-cresol, mixtures of cresols, xylenols, polyhydroxy benzenes, xylene and other polyalkyl benzenes, high boiling petroleum hydrocarbons, etc.

Instead of dissolving the polyester-amide resins of the present invention in a solvent, it is sometimes desirable to use the resinous materials without a solvent being present. For these applications the resin is merely allowed to cool to room temperature without the addition of any type of solvent. This results in a brittle solid mass which may be ground into a powder if desired for further use. Where the resin has been obtained in powder form and it is subsequently desired to use it in solution, the resin may be added to a suitable solvent and the mixture heated up to a temperature of about 100° C. until complete solution of the resin takes place.

When the polyester-amide resins of the present invention are to be employed as magnet wire enamel, the resins are applied to the wires from solution or from aqueous dispersion by well-known methods. For optimum results I have found that solutions containing from about 20 to 30 percent resin solids should be employed. These solutions can be prepared by diluting higher concentration resin solutions with any of the resin solvents mentioned above.

The method of applying the resin to wire comprises passing the wire through the resin solution, and then through an oven maintained at an elevated temperature to cure the resin on the wire. Where desired, the wire may be passed through the resin solution and a die a number of times and through the oven after each pass through the resin solution. This will provide a greater enamel build than is obtainable with only one pass through the resin solution.

In order to insure complete curing of the polyester-amide resins of the present invention when applying them to conductors, it is desirable to employ a curing catalyst to accelerate the curing reaction in the resin solution during the coating operation, although satisfactory results are obtained without the use of such a catalyst. Among the many curing catalysts suitable for this purpose may be mentioned zinc octoate, cadmium octoate, aromatic diisocyanates, aliphatic diisocyanates, etc. Where metal containing curing catalysts are employed, satisfactory results are obtained using from about 0.2 to 1.0 percent, by weight, of the metal element of the catalyst based on the total resin solids present in the solution.

Where the polyester-amide resins of this invention are to be employed as slot insulation in dynamoelectric machines, it is necessary to form cured sheets or films of the resins. This can be accomplished by any of the conventional film forming methods such as casting a solution of the resin and heating the casting to drive off the solvent and curing the resin. Films can also be formed by extruding viscous solutions of the resins into a heated chamber where curing takes place. Films formed from these resins are tough, flexible products having high dielectric strength, thermal stability at temperatures of at least 135° C., and good tensile strength. These films may be used as slot insulation on dynamoelectric machines by lining the slots in armatures with the film and placing the insulated windings into the lined slots. These films can also be used as the dielectric material in capacitors and are particularly valuable for use in aluminum foil type capacitors.

It is seen that the polyester-amide resins of the present invention are actually prepared in two steps. In the first step the reactants are cooked to a substantially linear polymeric form with the composition of the linear resin being essentially the same as the starting composition. This linear polymer is then further cured by the application of heat.

In the following illustrative examples (where all parts are by weight) the preparation and properties of a number of polyester-amide resins of the present invention are described. Most of the examples describe the preparation of the resin. In all cases the resin was applied by passing copper (50 mil) and aluminum (40 mil) conductors through the resin solution to deposit a build of about 1–1.5 mils resin, and curing the treated wire for varying lengths of time at a temperature of from 270–300° C. The coated wire samples were then tested for flexibility before heat-aging and for heat shock resistance. In all of the examples where cresol is mentioned as a solvent, the cresol used was the U.S.P. cresol comprising a mixture of isomeric cresols (primarily m-cresol) in which 90 percent of the mixture distills at 195° to 205° C. at atmospheric pressure and which has a specific gravity of 1.030–1.039 at 25° C. The glycerine used in the examples is 95 percent glycerine which contains about 5 percent moisture. The concentration of glycerine used in the examples is calculated on the basis of 100 percent glycerine.

In all of the following examples which relate to the preparation of resins and the application of these resins to electrical conductors, the resins formed were dissolved hot in cresol to a solids content of from 16.5 to 42.8 percent, by weight.

*Example 1*

A polyester-amide resin was prepared from the following components:

|  | Parts | Mols | Equivalent Percent |
|---|---|---|---|
| Dimethyl terephthalate | 291.3 | 1.5 | 46 |
| Ethanolamine | 61.1 | 1.0 | 31 |
| Glycerine | 48.4 | 0.5 | 23 |
| Lead acetate | 0.5 | | |
| Xylene | 83.6 | | |

The above components were heated in a round bottom flask fitted with a stirrer, condenser, and Dean-Stark trap. The mixture was heated slowly to 150° C. while xylene and methanol distilled off; the heating was continued to 250° C. for a total heating period of 3 hours. The resin was then allowed to cool and thereafter dissolved in cresol to make solutions containing 34.6 percent and 16.5 percent resin solids. Copper (50 mil) and aluminum (40 mil) wire strips were coated with the resin by hand dipping the metal wire strips in the resin solutions and heating the coated wire for 4 minutes at 270–300° C. to give a build (i.e., increase in diameter of the insulated conductor over the metallic core) of about 1 to 1.5 mils resin insulation. Each of the conductors was then wound around a mandrel equal in diameter to the diameter of the wire to determine the initial flexibility. Both coated wires passed this test. No cracking developed on the samples wound around mandrels which had diameters three times the diameter of the wire, even after the coated pre-wound wire was heated at 300° C. for 45 minutes, indicating exceptionally good heat shock resistance. A wire sample of the copper conductor pre-wound to a 1 diameter bend showed no crazing after immersion in boiling water for 8 hours. A sample of insulated cured wire, which was exposed to water vapor at 140° C. in a sealed tube (this is a very severe test) did not begin to blister until after 30 hours, which is more than twice as long as when a polyester using ethylene glycol in place of ethanolamine is used.

*Example 2*

A resinous composition was prepared similarly as in Example 1 from the following ingredients:

|  | Parts | Mols | Equivalent Percent |
|---|---|---|---|
| Dimethyl isophthalate | 582.6 | 3.0 | 48 |
| Ethylene glycol | 93.1 | 1.5 | 24 |
| Ethanolamine | 61.1 | 1.0 | 16 |
| Glycerine | 48.4 | 0.5 | 12 |
| Lead acetate | 1.0 | | |

The same conditions were used in this example as were used in Example 1, but instead employing a heating schedule of about 65 minutes at a temperature of 125–160° C., for 5 hours at 160–230° C., and finally for 2¾ hours at 180–247° C. The resin was cooled, dissolved in cresol to about a 37% solids solution, and 50 mil copper wire was dipped in the resin solution and thereafter heated for 20 minutes at 300° C. This coated conductor was flexible and could be bent around mandrels three times and five times the diameter of the copper wire without any evidence of cracking. A film cast from the cresol solution and cured within the range of from 200–300° C. showed a tensile strength of about 9600 p.s.i.

Example 3

A resinous composition was prepared similarly as in Example 1 from the following ingredients:

|  | Parts | Mols | Equivalent Percent |
|---|---|---|---|
| Dimethyl isophthalate | 291.3 | 1.5 | 46 |
| Ethanolamine | 61.1 | 1.0 | 31 |
| Glycerine | 48.4 | 0.5 | 23 |
| Lead acetate | 0.5 | | |

The heating schedule for this resin comprised heating the mixture of ingredients for 45 minutes at 135–150° C., for 2 hours at 150–235° C. and for 25 minutes at 235–245° C. The resinous composition thus obtained was dissolved in cresol to a 30 percent resin solids solution. Copper wire was dipped similarly as was done in Example 1 and the wire cured by heating for 4 minutes at 270–300° C. This resulted in a flexible abrasion resistant coating on the wire. When the insulated conductor was wound around a mandrel having a diameter 5 times the diameter of the wire, and then heated for 45 minutes at 300° C., there was no evidence of cracking of the insulating film.

Example 4

In this example the same ingredients and in the same proportions were heated similarly as in Example 3 with the exception that there was also added 0.5 part aluminum acetate to the reaction mixture. The heating cycle comprised heating the mixture of ingredients for 1 hour at 120–130° C., 1 hour at 130–200° C., and 1 hour at 200–220° C. The resin thus obtained, which was somewhat lighter in viscosity than the other resins, was formed into a 42.2 percent resin solids solution by combining it with a cresol solvent. Fifty mil copper wire was dipped in this resin solution similarly as was done in the preceding examples and heated for 4 minutes at 280–300° C. to give an insulated conductor whose insulation was extremely flexible as evidenced by the fact that it could be bent around a mandrel having the same diameter as the copper wire without any evidence of cracking. The heat-treated conductor could be wound around a mandrel having a diameter of three times the diameter of the wire, and heated for 45 minutes at 300° C. without evidence of cracking, showing good heat shock resistance of the insulated conductor.

Example 5

This example illustrates the effect of substituting another type of alkanolamine in place of the ethanolamine employed in the preceding examples. More particularly, 291.3 parts dimethyl terephthalate (1.5 mol), 62.1 parts ethylene glycol (1.0 mol), and 74.5 parts triethanolamine (0.5 mol), together with 1 part lead acetate and 150 parts xylene were heated similarly as in the preceding examples but employing a heating schedule of 1 hour and 55 minutes to go from room temperature to 160° C., then for 1 hour at 160–260° C., and then for 1 hour and 15 minutes at a temperature of 160–260° C. The resin thus obtained was dissolved in cresol to form a solution of 42.8 percent resin solids. Copper wire was dipped into this solution and heated for 4 minutes at 280–300° C. to give a moderately hard resin film which cracked when bent at room temperature around a mandrel having 10 times the diameter of the conductor core.

Although the utility of the polyester-amide resin of my invention has been described principally in terms of electrical applications, it should be understood that these resins may be used in all of the other applications suitable for synthetic resins. Thus, these resins can be employed in protective coating applications by applying the resin in a suitable solvent to a surface by brushing or spraying with subsequent curing. When used as a protective coating, these resins have good resistance to weathering. These resins can also be employed in varnish and paint formulations. These resins can also be used in molding powder formulations by mixing them with various fillers such as wood flour, diatomaceous earth, carbon, silica, mica, etc. These resins are also useful as impregnants and as bonding materials for metallic and fibrous laminates.

The polyester-amide resins of the present invention may be mixed and cured with minor amounts of other resins such as melamine-formaldehyde resins, epoxide resins such as the reaction product of epichlorohydrin and bis-phenol-A, phenol-formaldehyde resins, aniline-formaldehyde resins, ureaformaldehyde resins, silicone resins, cellulose acetate resins, polyamide resins, vinyl resins, ethylene resins, styrene resins, butadiene-styrene resins, etc. These polyester-amide resins may be combined with the polyester compositions disclosed and claimed in the copending application of Daniel W. Fox and Frank M. Precopio, Serial No. 474,624, filed December 10, 1954, and assigned to the same assignee as the present invention.

In the foregoing discussion and examples, I have described the preparation of the polyester-amide resins of the present invention from a mixture of ingredients including a lower dialkyl ester of terephthalic or isophthalic acid. However, it should be understood that instead of the lower dialkyl ester, I may use the acid itself, or the half ester of the acid, but I prefer to use the lower dialkyl ester because of the greater solubility and reactivity of the diester than of the acid itself or its other derivatives.

What I claim as new and desire to secure by Letters Patent of the United States is:

1. An insulated conductor comprising a metallic conducting core selected from the class consisting of copper, aluminum, alloys of copper, and alloys of aluminum, and a cured polyester-amide resin as an insulation of said core consisting essentially of the product of reaction of (1) from about 25 to 56 equivalent percent of dimethyl ester of an acid selected from the class consisting of terephthalic acid and isophthalic acid and mixtures of said acids, (2) from about 15 to 46 equivalent percent of ethanolamine, (3) up to 30 equivalent percent ethylene glycol and (4) from about 12 to 44 equivalent percent of glycerine, the total equivalent percent of (2) and (3) being at most 46 equivalent percent, the said insulation having an improved resistance to moisture.

2. An insulated conductor comprising a copper core and a cured polyester-amide resin as an insulation on said core consisting essentially of the product of reaction of from about 25 to 56 equivalent percent of dimethyl terephthalate, from about 15 to 46 equivalent percent of ethanolamine, and from about 12 to 44 equivalent percent of glycerine, the said insulation having an improved resistance to moisture.

3. An insulated conductor comprising a copper core and a cured polyester-amide resin as an insulation on said core consisting essentially of the product of reaction of from about 25 to 56 equivalent percent of dimethyl isophthalate, from about 15 to 46 equivalent percent of ethanolamine, and from about 12 to 44 equivalent percent of glycerine, the said insulation having an improved resistance to moisture.

4. An insulated conductor comprising a copper core and a cured polyester-amide resin as an insulation on said core composed essentially of the product of reaction of (1) from about 25 to 56 equivalent percent dimethyl isophthalate, (2) from about 15 to 46 equivalent percent of ethanolamine, (3) up to 30 equivalent percent ethylene glycol, and (4) from about 12 to 44 equivalent percent glycerine, the total equivalent percent of (2) and (3) being equal at most to 46 equivalent percent.

5. An insulated conductor comprising a metallic conducting core selected from the class consisting of copper, aluminum, alloys of copper, and alloys of aluminum, and a cured polyester-amide resin as an insulation on said core consisting essentially of the product of reaction of (1) from about 25 to 56 equivalent percent of a dimethyl ester of an acid selected from the class consisting of terephthalic acid and isophthalic acid and mixtures of said acids, (2) from about 15 to 46 equivalent percent of ethanolamine, and (3) from about 12 to 44 equivalent percent of glycerine, the said insulation having improved resistance to moisture.

References Cited by the Examiner
UNITED STATES PATENTS

| | | | |
|---|---|---|---|
| 2,576,045 | 11/51 | Robinson et al. | 260—75 |
| 2,626,223 | 1/53 | Sattler et al. | 260—33.4 |
| 2,727,881 | 12/55 | Caldwell et al. | 260—25 |
| 2,730,459 | 1/56 | Holmen et al. | 260—75 |
| 2,889,304 | 6/59 | Sheffer et al. | 260—33.4 |
| 2,936,296 | 5/60 | Precopio et al. | 260—33.4 |

MORRIS LIEBMAN, *Primary Examiner.*

DANIEL ARNOLD, LEON J. BERCOVITZ, *Examiners.*